(12) United States Patent
Brooksby et al.

(10) Patent No.: US 11,015,889 B2
(45) Date of Patent: May 25, 2021

(54) LOCATION-BASED GUN MAGAZINE

(71) Applicant: Connor Brooksby, Washington, UT (US)

(72) Inventors: Connor Brooksby, Washington, UT (US); Wayne A. Provost, St George, UT (US)

(73) Assignee: Connor Brooksby, Washington, UT (US)

( * ) Notice: Subject to any disclaimer, the term of this patent is extended or adjusted under 35 U.S.C. 154(b) by 0 days.

(21) Appl. No.: 16/712,573

(22) Filed: Dec. 12, 2019

(65) Prior Publication Data

US 2020/0240728 A1   Jul. 30, 2020

Related U.S. Application Data (60) Provisional application No. 62/778,694, filed on Dec. 12, 2018.

(51) Int. Cl.
| | | |
|---|---|---|
| *F41A 9/61* | (2006.01) | |
| *F41A 17/06* | (2006.01) | |
| *G01S 19/25* | (2010.01) | |

(52) U.S. Cl.
CPC ............. *F41A 9/61* (2013.01); *F41A 17/06* (2013.01); *G01S 19/25* (2013.01)

(58) Field of Classification Search
CPC .......... F41A 9/61; F41A 17/06; F41A 17/063; F41A 17/34
USPC .............................................. 42/70.01, 70.02
See application file for complete search history.

(56) References Cited

U.S. PATENT DOCUMENTS

| | | | | |
|---|---|---|---|---|
| 2,114,311 | A * | 4/1938 | Nomar | F41A 9/65 42/49.01 |
| 5,450,683 | A * | 9/1995 | Miller, IV | F41A 9/65 221/278 |
| 6,412,207 | B1* | 7/2002 | Crye | F41A 17/02 42/70.01 |
| 2009/0094875 | A1* | 4/2009 | Kim | F41A 9/70 42/1.02 |
| 2011/0030259 | A1* | 2/2011 | Castro | F41C 23/22 42/6 |
| 2011/0167695 | A1* | 7/2011 | Faifer | F41A 9/67 42/50 |
| 2014/0259841 | A1* | 9/2014 | Carlson | F41A 17/063 42/1.01 |
| 2016/0252317 | A1* | 9/2016 | Biran | F41A 17/38 42/1.01 |
| 2018/0066910 | A1* | 3/2018 | Biran | F41A 17/46 |
| 2018/0299218 | A1* | 10/2018 | Myers | F41A 9/67 |
| 2019/0154374 | A1* | 5/2019 | Myers | F41A 9/70 |
| 2020/0096271 | A1* | 3/2020 | Vito | F41A 9/67 |

* cited by examiner

*Primary Examiner* — Bret Hayes
(74) *Attorney, Agent, or Firm* — Gurr Brande & Spendlove, PLLC; Robert A. Gurr

(57) ABSTRACT

A location-based gun magazine has a housing having a plurality of locking apertures, a spring, a wireless receiver switching device, a battery, and an electromagnet locking mechanism. The electromagnet locking mechanism has a locking tab for engaging and locking with the plurality of locking apertures, the locking tab actuatable via the electromagnet, the electromagnet receiving a signal from the wireless receiver switching device. The wireless receiver switching device may have a radio receiver, a GPS chip, or other device for receiving location-based information.

3 Claims, 8 Drawing Sheets

LOCATION-BASED GUN MAGAZINE

CROSS-REFERENCE TO RELATED APPLICATIONS

This application claims the benefit of U.S. Provisional Application Ser. No. 62/778,694, filed on Dec. 12, 2018, which is incorporated herein by reference.

TECHNICAL FIELD

The present disclosure relates to firearms. More particularly, the present disclosure relates to a gun magazine that is controlled depending upon its physical location.

BACKGROUND

The U.S. Second Amendment is a vital part of the Constitution, and one that allows the bearing of arms. However, with the rise in domestic terrorism and mass-shootings, particularly at schools, there remains a need to protect the innocent. As a result, gun-control legislation is a constant topic among lawmakers. However, while many legislative positions have been suggested, those positions have failed to be become laws mainly due to the contrary effect it would have on the Second Amendment. As a result, there remains a need to protect the innocent while not infringing the rights of the people to bear arms under the Second Amendment.

Further, there remains a need of a gun owner to control where, when, and how their weapon is fired. For example, a gun owner that uses a gun for sport may desire that the gun not be capable of firing in the house. Currently, there are a number of methods employed by gun owners to prevent unwanted firing, such as trigger locks, gun safes, disassembling the weapon, etc. However, most of these methods are time-consuming, burdensome, and require affirmative action by the gun owner. If a user fails to take one of the above precautions, the firearm risks being fired by accident or in an unauthorized manner, such as by a third-party who gained access to the firearm. Therefore, there remains a need for a method of controlling/securing a firearm without requiring affirmative steps.

Likewise, a gun owner may desire a firearm for self-defense in the home, but may not want that gun to be used as part of a shooting outside of the home in a non-defense situation. Accordingly, there remains a need to control/secure a gun by an owner without having to undertake affirmative steps.

Accordingly, the present invention seeks to solve these and other problems.

SUMMARY OF EXAMPLE EMBODIMENTS

In one embodiment, a location-based gun magazine comprises a housing having a plurality of locking apertures, a spring, a wireless receiver switching device, a battery, and an electromagnet locking mechanism coupled to a follower. In one embodiment, the electromagnet locking mechanism comprises a locking tab for engaging and locking with the plurality of locking apertures, the locking tab actuatable via the electromagnet, the electromagnet receiving a signal from the wireless receiver switching device.

In one embodiment, the wireless receiver switching device comprises a radio receiver. In one embodiment, the wireless receiver switching device comprises a GPS chip.

In one embodiment, a location-based gun magazine comprises a housing having a spring, a wireless receiver switching device, a battery, a solenoid, a spool, and a cable coupled to the follower and windable on the spool.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may. Further, particular features, structures, or characteristics in one drawing of "one embodiment" may be combined with any other drawing in any other embodiment.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need to protect the innocent while not infringing the rights of the people to bear arms under the Second Amendment. Further, there is a need for a method of controlling/securing a firearm without requiring affirmative steps by a user. The location-based gun magazine described below solves these, and other, problems.

Figure 1:
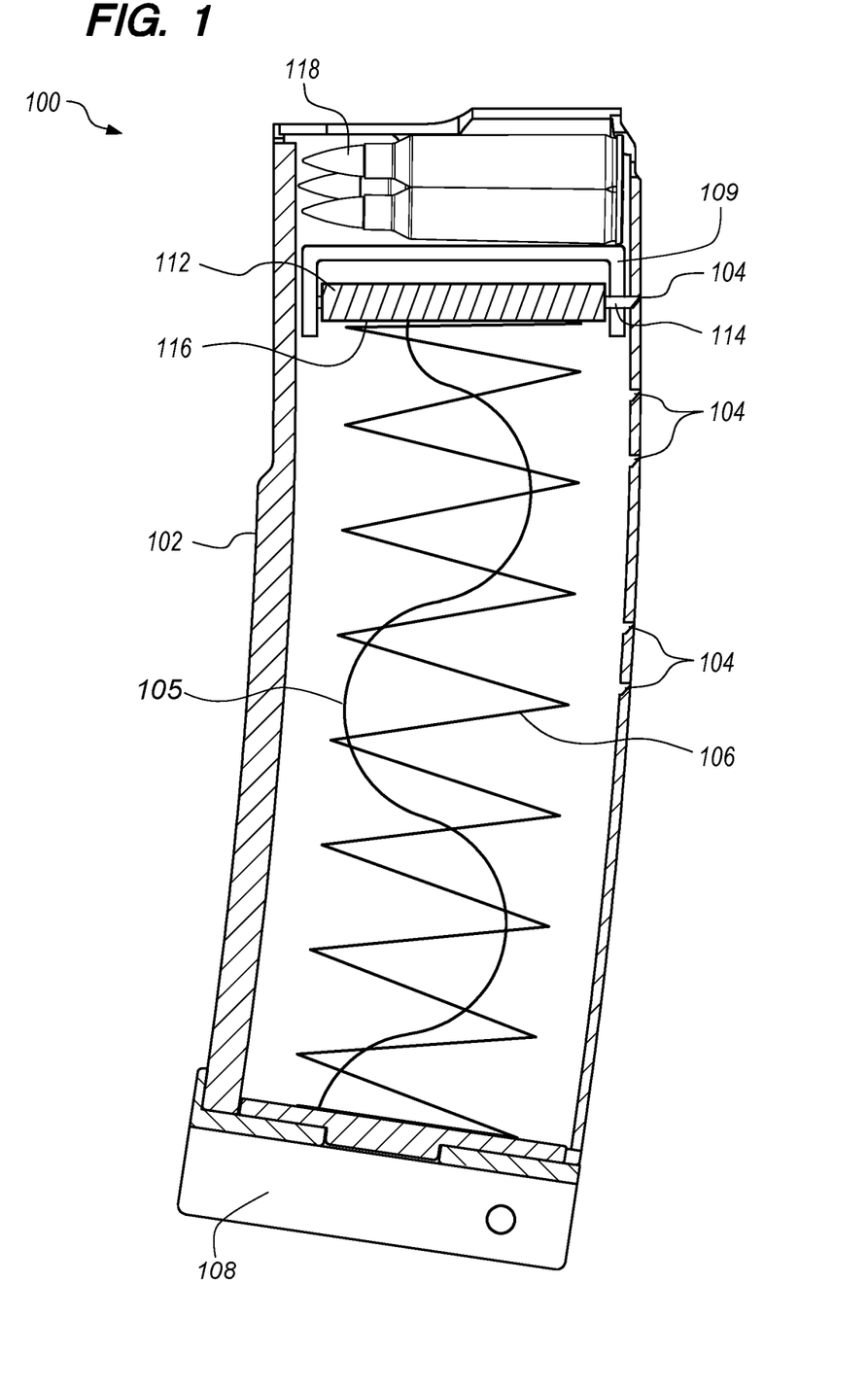
FIG. 1 illustrates a cross-section of a side elevation view of a location-based gun magazine.

In one embodiment, as generally shown in FIG. 1, a location-based gun magazine 100 comprises a housing 102 having a plurality of locking apertures 104, a spring 106, a wireless receiver switching device 108, a battery 110 (FIG. 3), and an electromagnet locking mechanism 112 (also referred to as a "follower lock"). In one embodiment, the electromagnet locking mechanism 112 comprises a locking tab 114 for engaging and locking with the plurality of locking apertures 104, the locking tab 114 actuatable via the electromagnet 116, the electromagnet 116 receiving a signal from the wireless receiver switching device 108 via wire 105. In one embodiment, the wireless receiver switching device 108 comprises a radio receiver. In one embodiment, the wireless receiver switching device comprises a GPS (Global Positioning System) receiver. Therefore, in one embodiment, the wireless receiver switching device 108 sends a signal to the electromagnet 116 based upon a signal received (radio) or based upon its location (GPS). In one non-limiting example, the wireless receiver device uses GPS to determine its location. If the location is determined to be a shooting zone (e.g., shooting range), the wireless receiver switching device 108 sends a signal, activating the electromagnet 116. When activated, the electromagnet 116 (e.g., solenoid) withdraws the locking tab 114 (i.e., linear actuator) from the locking apertures 104. This allows the spring 106 to extend as bullets 118 are expended, allowing successive bullets 118 to be used (i.e., functions as a standard gun magazine). In the alternative, if the GPS receiver of the wireless receiver switching device 108 is not in a safe zone (e.g., a school), the solenoid (electromagnet 116) remains inactive and the locking tab 114 remains extended through a locking aperture 104, preventing the advancement of the follower 109, which prevents bullets 118 from entering the gun for use.

Figure 2:
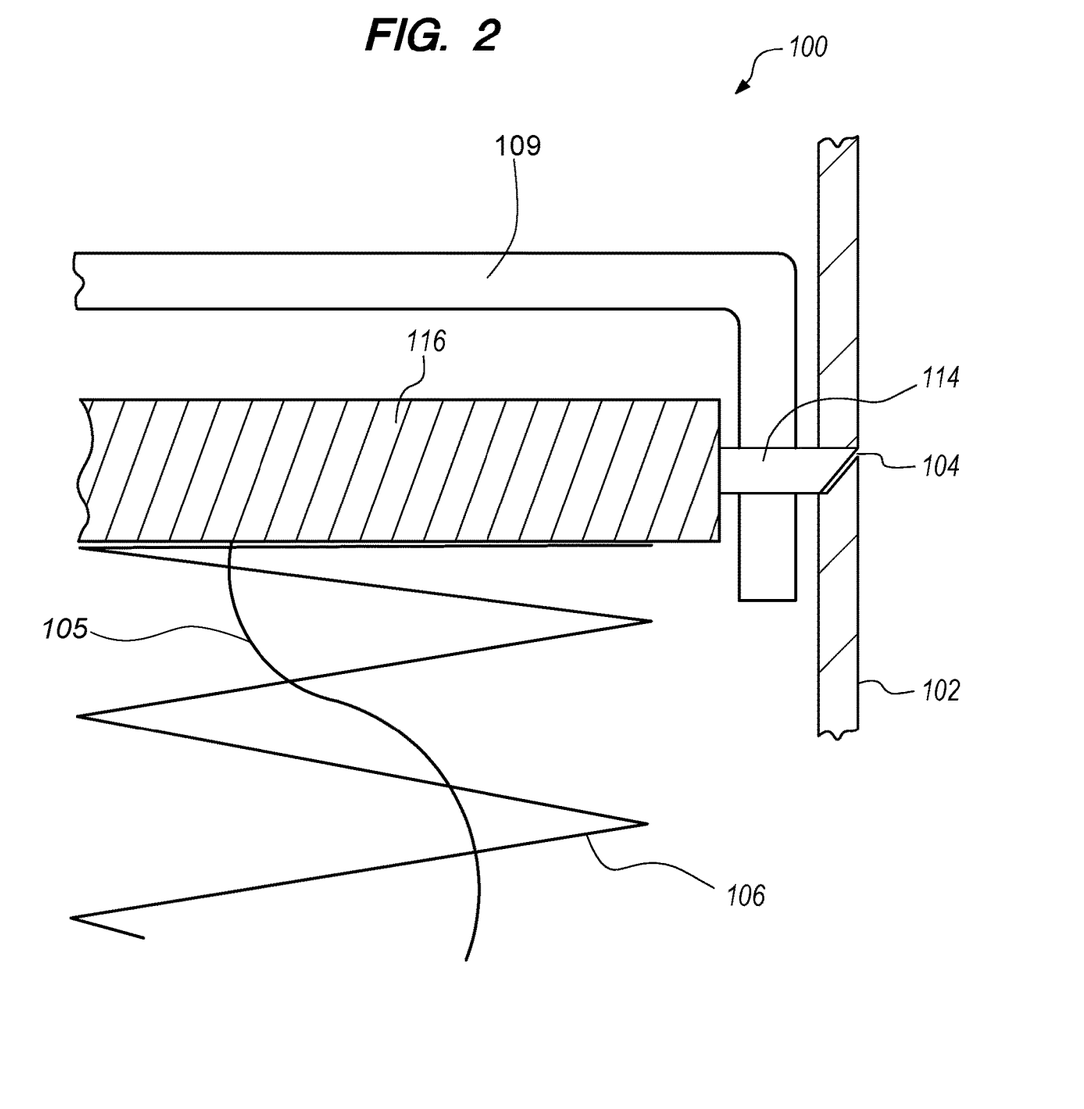
FIG. 2 illustrates a detailed cross-section of a location-based gun magazine.

As shown in FIG. 2, the locking tab 114 may be shaped (e.g., angled) so as to allow movement in a first direction (i.e., downward for loading the magazine 100) while prohibiting movement in a second direction (i.e., prohibiting movement upward, keeping the follower 109 from advancing). In this manner, when the locking tab 104 is engaged, bullets 118 may not exit the magazine 100. In one embodiment, shooting zones (e.g., shooting ranges) may be programmed by the manufacturer or may be input by the owner. For example, an owner of a gun may program the magazine 100 so that the magazine 100 only functions at certain shooting ranges. In this way, the owner's gun may not be used, stolen, or otherwise used in an unauthorized manner for a mass-shooting. In other words, the magazine 100 will only function at a gun range, or other area as defined by the owner (or manufacturer).

Other scenarios are envisioned. For example, a homeowner may desire a gun for self-defense, but would not allow that gun to be fired at a school. The owner could program the magazine 100 to be usable at home (i.e., the locking tab 114 would be withdrawn from the locking apertures 104) while not being usable outside of the owner's property (i.e., locking tab 114 engaged with the locking aperture 104). Again, this prevents unauthorized use of the weapon for domestic terrorism, mass shootings, or other violence.

The wireless receiving switching device 108 may be programmable using a computer or smartphone interface using USB cables or wireless connections (e.g., Bluetooth®). Once connected to the wireless receiving switching device 108, a user may customize its use via a user input display (e.g., phone or computer) by programming a microcontroller or similar device on the wireless receiver switching device 108.

Figure 3:
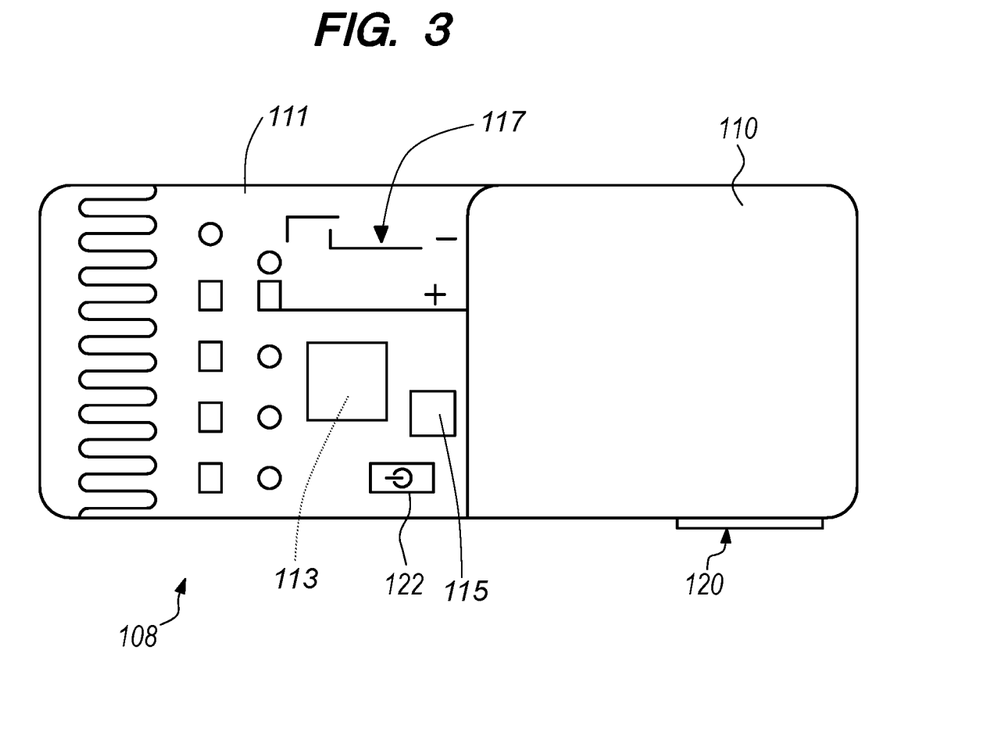
FIG. 3 is a diagram of a wireless receiving switching device of a location-based gun magazine.

FIG. 3 illustrates the wireless receiver switching device 108 in greater detail. As shown, the wireless receiver switching device 108 comprises a circuit board 111, microcontroller 113, GPS receiver 115, switch 117, and battery 110. The battery 110 may be rechargeable, such as using a charging port 120. In one embodiment, if the battery 110 is overly drained or disconnected, the locking tab 114 remains extended and engaged with a locking aperture 104. This result is achieved by the electromagnet 116 being de-energized with the locking tab 114 remaining extended (such as by using a spring, as is common in solenoid linear actuator systems). This prevents a user from merely disconnecting the battery 110 in an attempt to utilize the magazine 100 in an unauthorized manner. The wireless receiver switching device 108 may also comprise an on/off switch 122, allowing the life of the battery 110 to be extended when not in use.

Figure 4:
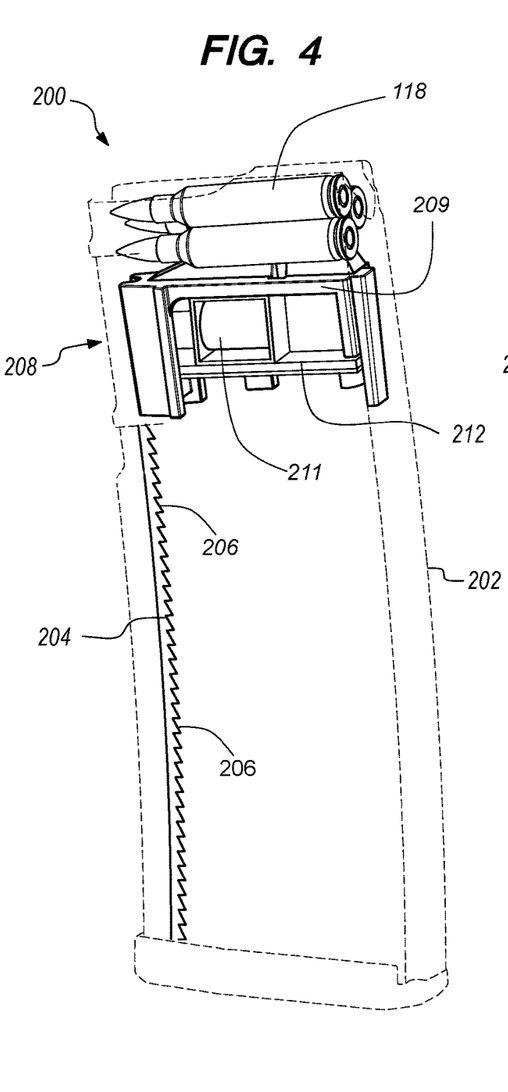
FIG. 4 illustrates a cutaway side view of a location-based gun magazine.
Figure 5:
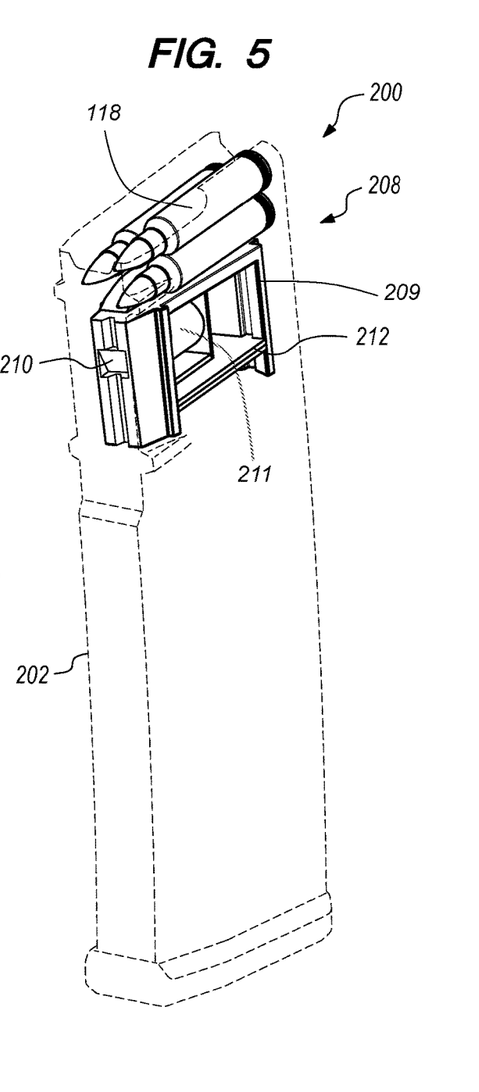
FIG. 5 illustrates a cutaway front perspective view of a location-based gun magazine.

Referring now to FIGS. 4-5, a location-based magazine 200 is shown that comprises a housing 202, a rack 204 comprising a plurality of teeth 206 along an inner wall of the housing 202, and a follower lock 208. The follower lock 208 comprises a linear actuator 211 for a locking tab 210. For example, the linear actuator 211 may be a screw-drive, an electromagnet, or other means. As shown, the follower lock 208 may comprise a circuit board 212, which may further comprise a microcontroller (or other controller/processor), a transceiver, and/or GPS receiver. As described in the earlier embodiments, the locking tab 210 may be controlled depending upon the physical location of the location-based magazine 200. In this embodiment, the locking tab 210 engages the rack 204, which prohibits movement of the bullets 118 in programmed locations. A typical spring (not shown) between the base of the magazine 200 and the follower 209 may be used to advance the follower 209 when the locking tab 210 is not engaged with the rack 204. Due to the arrangement of the teeth 206 on the rack 204 and the locking tab 210, the follower 209 may be depressed and bullets 118 inserted into the magazine regardless of location.

However, the locking tab 110 prohibits the follower 209 from advancing. Accordingly, if the GPS receiver is within the known range, as determined by the microcontroller, the locking tab 210 is disengaged from the teeth 206, allowing the follower 209 to advance and eject bullets 118 from the magazine 200.

Figure 6:
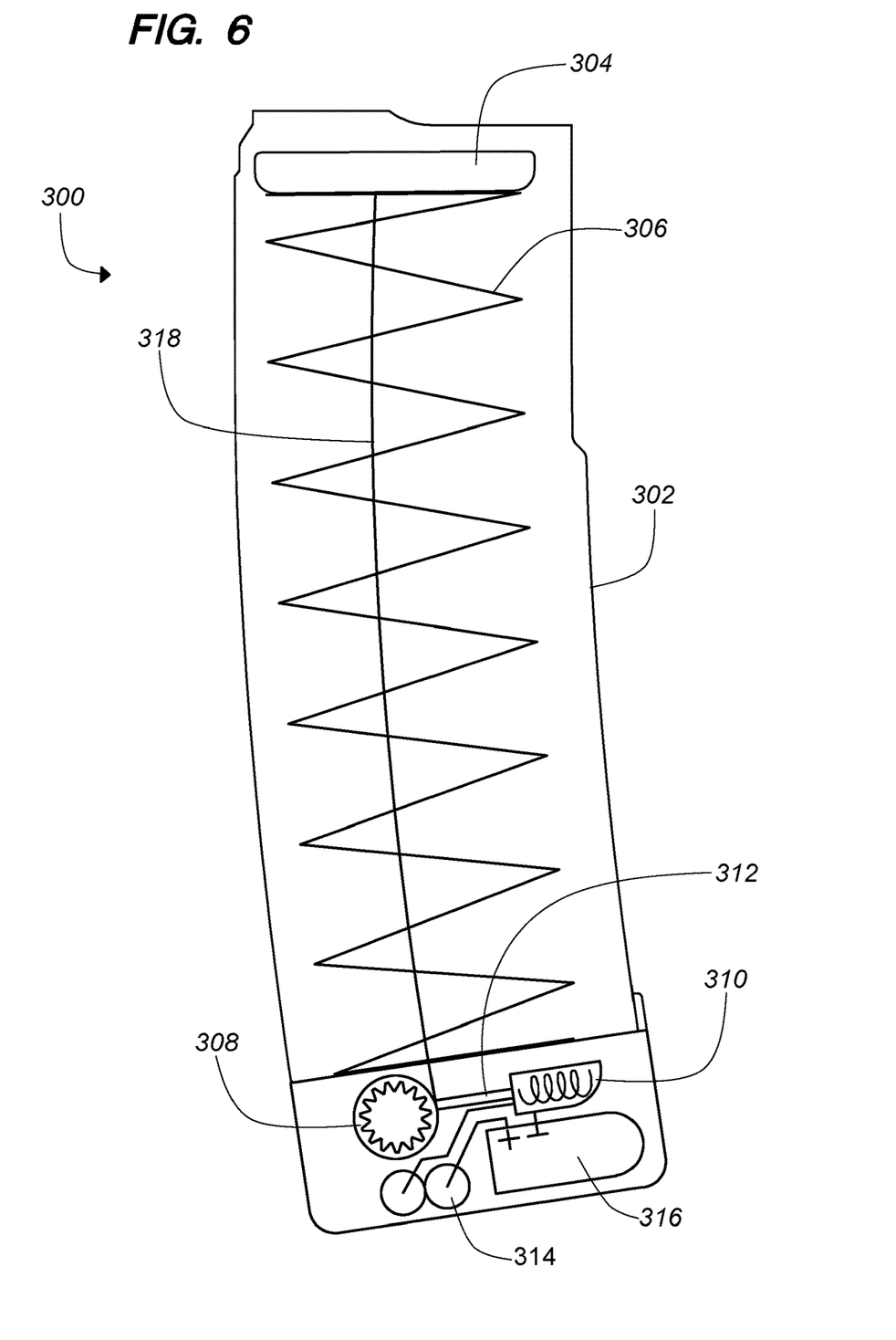
FIG. 6 illustrates a side cross-section of a location-based gun magazine.
Figure 7:
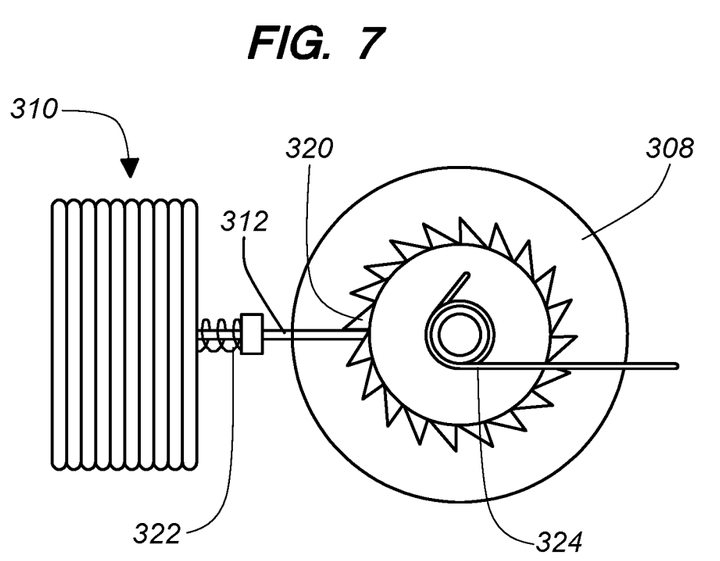
FIG. 7 illustrates a detailed side view of a follower lock of a location-based gun magazine.
Figure 8:
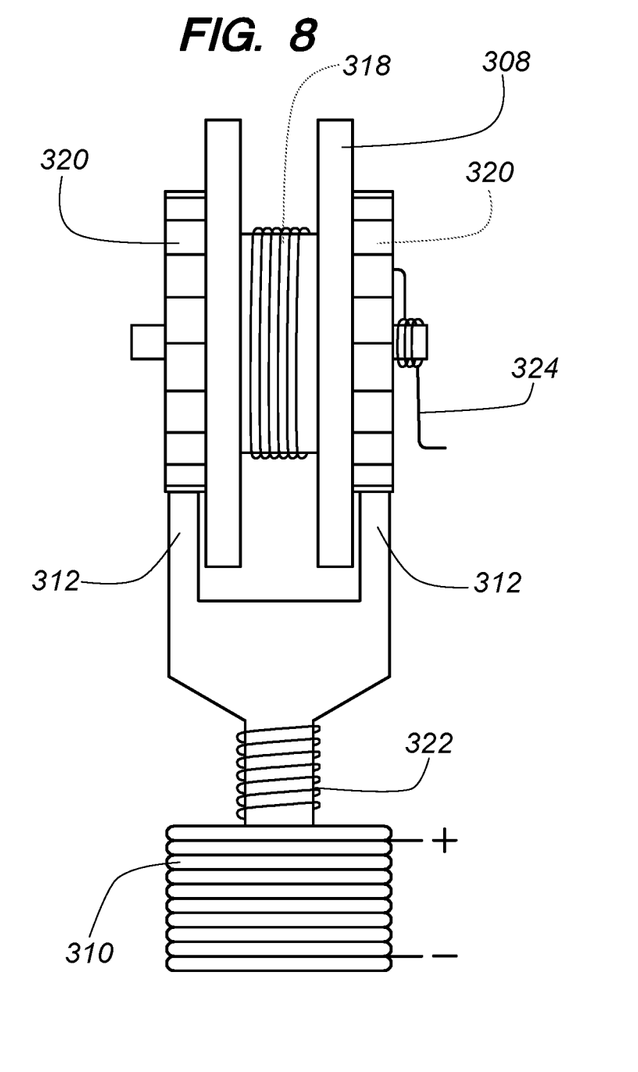
FIG. 8 illustrates a detailed top view of a follower lock of a location-based gun magazine.
Figure 9:
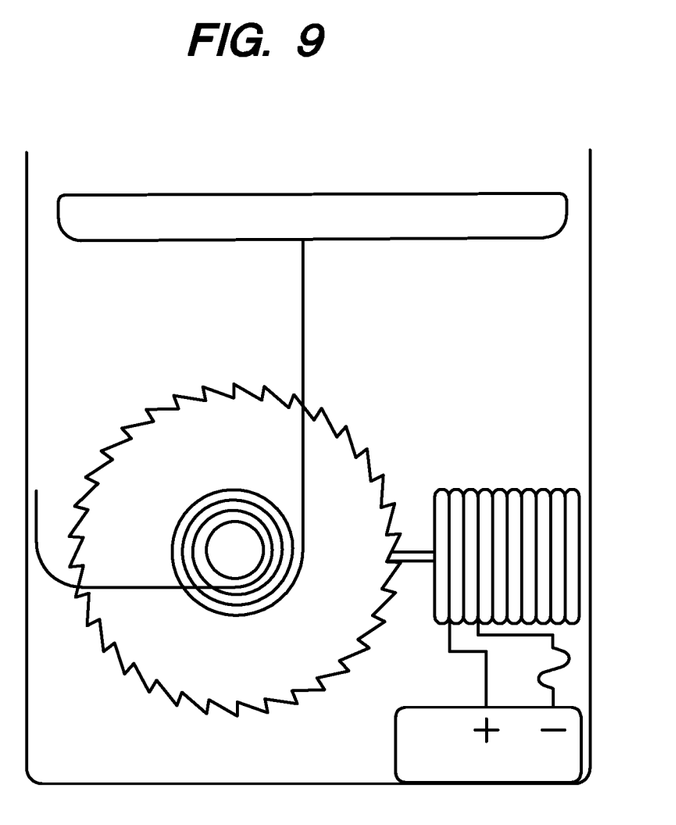
FIG. 9 illustrates a side view of a follower lock of a location-based gun magazine.

FIG. 6 illustrates a location-based magazine 300 comprising a housing 302, a follower 304, a spring 306 for advancing the follower 304, and a follower lock comprising a spool 308, a solenoid 310 with a rod 312 (together functioning as a linear actuator) for locking the spool 308, a radio/GPS receiver 314, and a battery 316. In one example of use, bullets are inserted into the magazine 300, forcing the follower 304 downward which compresses the spring 306. Spring 306 is what forces the follower 304 upward, advancing bullets as they are fired. Here, a cable 318 is coupled to the follower 304 and is wound around spool 308. In other words, as follower 304 is lowered into the magazine 300, the spool 308 winds the cable 318. As best seen in FIGS. 7-8, when the solenoid 310 is in a de-energized state, the rod 312 is extended, using spring 322, and engages one or more teeth 320 of the spool 308. As understood, the spool 308 may use a spring 324 so as to maintain the cable 318 wound thereon. As a result of the rod 312 engaging the spool 308, the cable 318 prohibits the follower 304 from advancing, which thereby prohibits the bullets from exiting the magazine 300.

When powered "on," the GPS receiver receives a signal, which is then processed by a microcontroller. If determined to be within a shooting area, the microcontroller energizes the solenoid, which causes the rod 312 to retract and disengage the spool 308. With the spool disengaged, the spring 306 may extend as bullets are fired, allowing the follower to advance unrestricted.

Accordingly, a method of controlling bullets using a location-based magazine comprises determining the location of a gun magazine, and based upon location, prohibiting the bullets from ejecting from the magazine into the firearm.

It will be appreciated that while radio and GPS were used as examples herein, the present invention is not limited to such technology, and other means of determining location may be used. For example, one alternative could be RFID chips, with the chips receiving signals from transmitters at certain locations (e.g., gun ranges). Similar technologies may be used. Further, while an electromagnet is disclosed, other methods of achieving the same result may likewise be employed. In other words, the locking tab 114 may be withdrawn from the locking aperture using any number of methods (e.g., linear actuators), which may not require an electromagnet. Such changes fall within the scope of this disclosure.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A location-based gun magazine for controlling ejection of bullets from the location-based magazine, comprising:
    a housing;
    a follower for advancing the bullets;
    a spring for advancing the follower;
    a follower lock comprising a solenoid, a spool, and a cable coupled to the follower, the cable windable on the spool; and
    a battery;
    wherein when the spool is in a locked position, the spring remains compressed and the follower remains stationary; and
    when the spool is in an unlocked position, the spring extends and advances the follower.

2. The location-based gun magazine of claim 1, further comprising a rod coupled to the solenoid, wherein when the rod is extended the spool is in a locked position, and when the rod is retracted the spool may unwind.

3. The location-based gun magazine of claim 2, wherein in response to a microcontroller determining, via GPS signals, that the location-based magazine is located within a predetermined location, the solenoid is activated, which retracts the rod, allowing the spool to unwind.

* * * * *